June 23, 1953     L. P. DE VAU ET AL     2,642,660
UNIVERSAL CONTOUR GENERATOR
Filed April 19, 1950     2 Sheets—Sheet 1
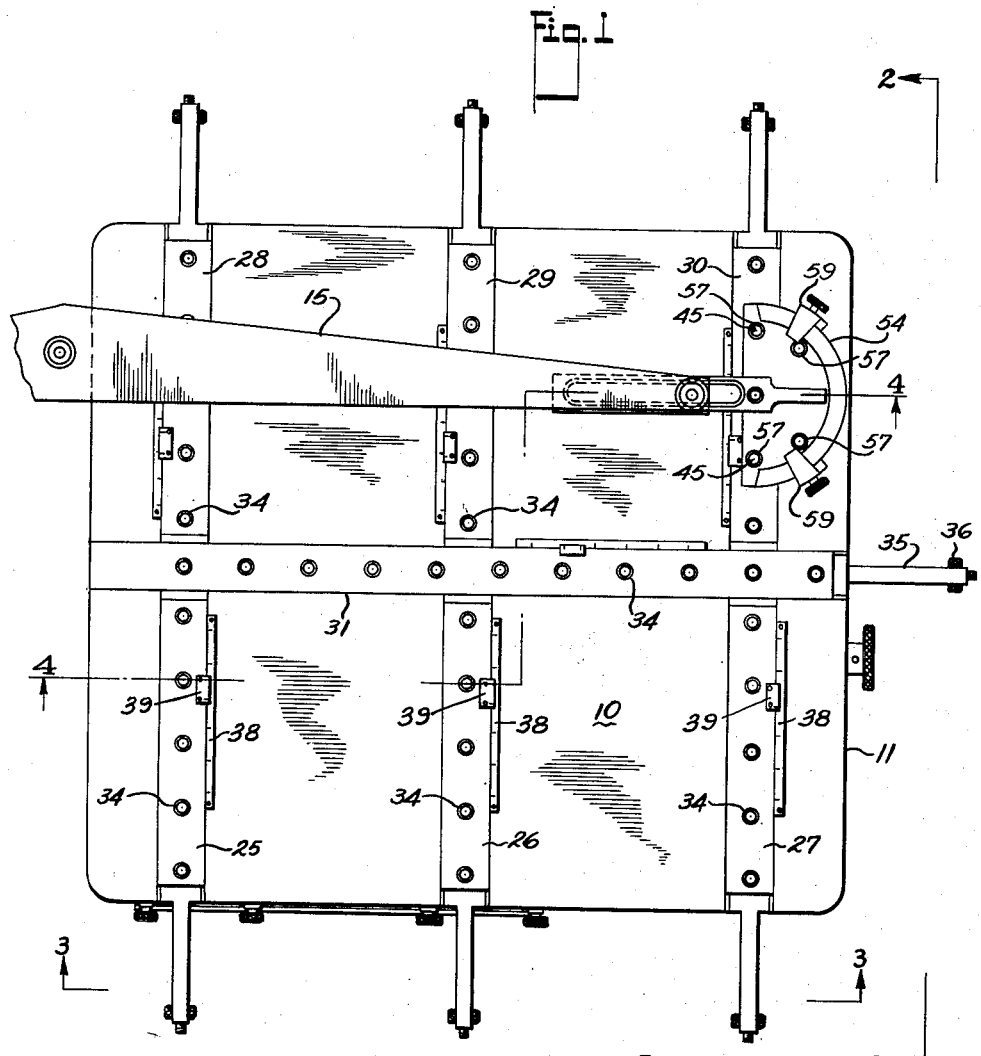
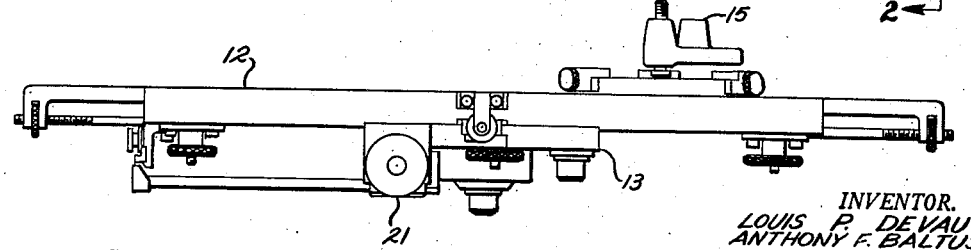
INVENTOR.
LOUIS P. DEVAU
ANTHONY F. BALTUS
BY
*Richey Watts*
ATTORNEYS June 23, 1953
L. P. DE VAU ET AL
2,642,660
UNIVERSAL CONTOUR GENERATOR
Filed April 19, 1950
2 Sheets-Sheet 2
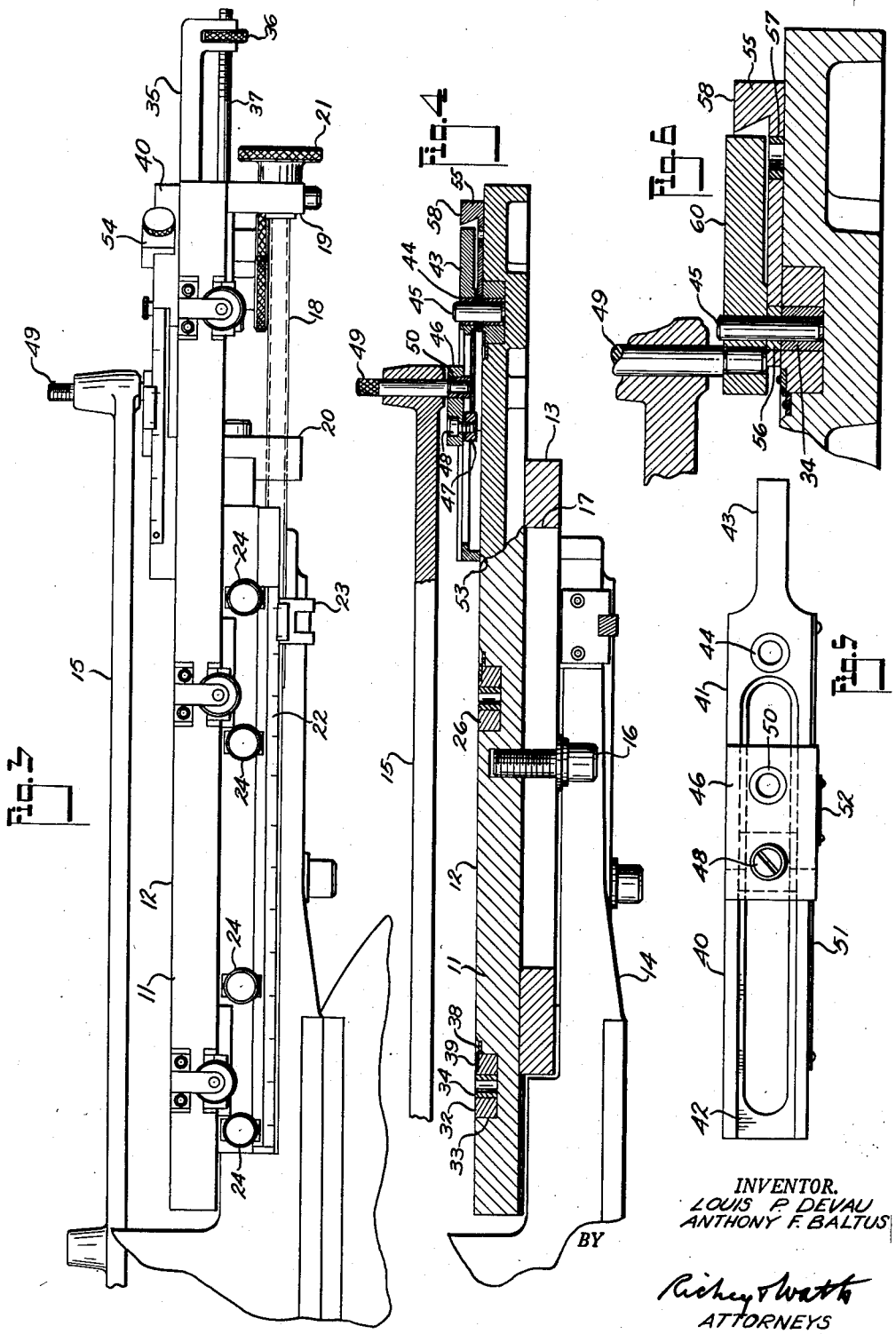
INVENTOR.
LOUIS P. DEVAU
ANTHONY F. BALTUS
BY Richey & Watts
ATTORNEYS Patented June 23, 1953

2,642,660

UNITED STATES PATENT OFFICE 2,642,660

UNIVERSAL CONTOUR GENERATOR

Louis P. De Vau, Cleveland Heights, and Anthony F. Baltus, Cleveland, Ohio, assignors to Republic Steel Corporation, Cleveland, Ohio, a corporation of New Jersey Application April 19, 1950, Serial No. 156,904

6 Claims. (Cl. 33—23)

This invention relates to pattern controlled metal working machines and, more particularly, to a contour generator for producing templates for such machines.

Known types of metal working machines use patterns or templates for the control of machining operations, particularly in the reproduction of work having complex configurations. These templates must be precisely formed either by hand or by means of a pantographic reproducing machine utilizing a master template, normally of several times the size of the work template. This system suffers certain limitations, even though the use of the pantographic reproducing machine and a large size master template provides a measure of reduction of inaccuracies in the work template outlines. A great deal of skill is required in the preparation of the templates, and the process is slow and expensive. Further, when using a pantographic reproducing machine, the difficulty of confining the movement of the pantograph leader to the precise pattern of the master template requires continuous close attention of the operator and leads to an unavoidable minimum of inaccuracies in the work template.

The present invention contemplates a contour generator useful in connection with pantographic reproducing machines whereby the above limitations may be overcome and the controlled reproduction of work templates may be accomplished rapidly and economically and by relatively unskilled operators. The contour generator, as herein disclosed, comprises a table having angularly related sets of slides incorporated in the top surface thereof. Each slide has a vernier mechanism and scales for the precise adjustment of the position of the slide with respect to the table and the other slides, and each slide incorporates bushings at precisely spaced intervals. These bushings serve as sockets for the reception of mounting dowels whereby the pantograph leader may be connected to the slide, either directly or through ancillary linkages. The contour generator is mounted upon the guide bed of the reproducing machine and the pantograph leader is guided by the linkages to simulate the outline of the contours to be machined. The motion of the tracer is thus precisely controlled and constrained for the reproduction operation without the use of a master template.

An object of the invention is the provision of means for the precise reproduction of work templates.

Another object of the invention is the precise control of pantograph leaders in reproducing machines.

A further object of the invention is to provide a flexible system for the reproduction of forms without the limitations imposed by the use of master templates.

A still further object of the invention is the provision of pantographic reproduction equipment which may be operated by relatively unskilled personnel.

A still further object of the invention is the provision of pantographic reproduction equipment which may be operated by relatively unskilled personnel.

A still further object of the invention is the reduction of the cost of producing work templates.

These and other objects, features, and aspects of the invention will be more readily apparent from a consideration of the following detailed specification and appended claims, taken in connection with the accompanying drawings, in which:

Fig. 1 is a plan view of a contour generator of the invention;

Fig. 2 is an elevation view of the contour generator taken along the lines 2—2 of Fig. 1;

Fig. 3 is an elevation view of the contour generator taken along the lines 3—3 of Fig. 1;

Fig. 4 is a vertical section taken along the lines 4—4 in Fig. 1 with portions of the generator in section and portions in cut-away;

Fig. 5 is a plan view illustrating particularly the adjustable radius link of the invention; and Fig. 6 is a section view illustrating particularly the protractor of the invention and a link for producing circles of small radii.

Referring now to Fig. 1, the contour generator includes a table which serves as a reference surface, and adjustable means, in the form of slides, for providing precisely determined reference points in either of two directions on the surface of the table. The table 10 comprises a plate 11 of suitable material and having a surface 12 which may be finished so as to be perfectly smooth. As is shown particularly in Figs. 3 and 4, the table is mounted upon a guide bed 13 of a reproducing machine 14. The reproducing machine may incorporate any of several well-known forms of reproduction control systems such as pantograph linkages, lazy tongs, or electrical transmission systems and an arm 15 represents the tracer arm or leader of the control linkage.

The table 10 is slidably mounted upon the guide bed 13 by means such as a stud 16 and a groove 17 in the bed plate. Fore and aft adjustment of the table 10 with respect to the bed 13 is not essential but serves to increase the scope of the device. Such fore and aft adjustment is accomplished by a screw shaft 18 supported from the table 10 by a bearing 19 and from the bed 13 by a bearing 20 and threadably engages a bushing (not shown) mounted in the bed 13. A control knob 21 serves to provide hand adjustment of the table position and a scale 22 and vernier indicator 23 provide a precise indication thereof. The scale 22 is clamped to the table 10 by means of thumb screws 24 so that the scale may be positioned at will.

The position determining elements of the contour generator comprise a series of slides mounted in the upper portion of the table. These slides are in general in sets, the slides of each set being in parallel relationship, while the sets of slides are angularly related. In the present apparatus, a series of lateral slides 25, 26 and 27, respectively, are positioned at one side of the center line of the table; and a similar series of lateral slides 28, 29 and 30, respectively, are positioned at the other side of the center line. A single slide 31 is positioned along the center line of the table for fore and aft movement, perpendicular to the lines of direction of the lateral slides. Referring now also to Fig. 4, each slide comprises a bar 32 received in a groove 33 formed in the plate 11. The bar 32 and groove 33 are machined for a close sliding engagement so as to minimize the play between the slide and the table, while the top surface of the bar is machined so as to provide a smooth continuation of the surface of the table. Each slide is provided with a series of bushings 34 mounted in the bar of the slide and spaced at precisely determined intervals.

The bushings 34 serve as receivers or sockets for dowel pins to support or constrain the movement of the arm 15, either directly or through linkages associated therewith. Independent adjustment of each of the slides is provided by means of an adjusting screw mechanism similar to that of the fore and aft slide 31 which includes an arm 35 mounted upon the end of the slide. The arm has a bifurcated end portion which receives a vernier adjusting nut 36 and an adjusting screw 37. The slide may be positioned by adjustment of the vernier nut 36 or, by removing the nut, the slide may be moved freely along its groove to produce a constrained linear motion in the direction of the slide. Each slide is further provided with a position indicating scale 38 and a vernier indicator 39 mounted in grooves below the surface of the table. These indicators and scales are accurately positioned and may preferably be so related to the slide and bushing positions that each scale gives an indication of the distance of the bushings of the slide of one set to the center line of a corresponding slide in the remaining set.

An adjustable radius link 40 (Fig. 5) serves to constrain the movement of the tracer arm 15 for describing circular movements about any reference point, as determined by the slides. The adjustable radius link 40 comprises a body 41 having a recessed portion 42 and an extended arm portion 43. A bushing 44 serves to accommodate a dowel, such as a dowel 45 (Fig. 4), whereby the link may be fixed to a slide. A link slide 46 is mounted in the recessed portion 42 of the radius link 40 and is adjustably secured thereto by means of a clamp 47 and a set screw 48. The tracer arm 15 is fixed to the link slide 40 by means of a dowel 49 and a bushing 50 in the link slide, while the distance of the arm 15 from the center of the link bushing 44 is accurately determined by means of a scale 51 and a vernier indicator 52. The under portion 53 of the link 40 is machined for smooth sliding engagement with the surface of the table 10.

As is shown in Fig. 6, the adjustable radius link 40 may be replaced by a solid link 60 having a relatively small spacing between the tracer arm dowel and the central dowel 45 for the production of circular movements of relatively small radii.

A protractor 54 serves to restrict the arcuate movement of the tracer arm 15 and is useful particularly in the generation of intersecting arcs. The protractor 54 comprises a body 55 which incorporates a central bushing 56 and a series of similar bushings 57 circumferentially spaced about the central bushing. The radial spacing between the central protractor bushing and the circumferential bushings may be equal to the spacing between the slide bushings and the protractor may be positioned with respect to a slide by a central dowel 45 and a circumferential dowel 57. The outer surface 58 of the protractor body is provided with a scale (not shown) and limit stops 59 for limiting the motion of the link arm 43 and hence the motion of the tracer arm 15.

In operation, the form to be generated is built up of arcs of circles and straight lines. The reproducing machine is set up for the desired ratio between the dimensions of the template to be reproduced and the dimensions of the outline traced by the contour generator. The radius link is positioned on appropriate slides and the arcs generated with reference to the center points of the successive slide positions, the link being adjusted to the appropriate setting for each arc. Where intersecting curves are to be joined, the protractor limit stops may be utilized to insure a tangential joining of the curves or otherwise prevent overcutting or undercutting. Linear motions may be generated by the slides or by the usual adjustments of the work bed of the reproducing machine. It is an advantageous operational feature of the machine that the dimensions utilized in generating the contours may be taken with respect to a center line in correspondence with the layout of engineering drawings.

It is to be understood that the specific nature of present disclosure is not intended to be restrictive or confining and that various rearrangements of parts and modifications of design may be resorted to without departing from the scope or spirit of the invention as herein claimed.

What is claimed is:

1. A contour generator for guiding a forming tool along exactly intersecting contour portions comprising a plate, grooves in the upper portion of said plate, at least one of the grooves extending in a first direction across the plate and at least one of the said grooves extending in a second direction across the plate, slide members in each of said grooves adapted to be secured at any predetermined position along the groove or moved along the groove, spaced bushings in said slides defining sockets, and a protractor having a body, a central bushing in said body, and circumferentially spaced bushings in said body spaced radially with respect to said central bushing a distance equal to the distance between said slide bushings, and dowels for positioning said protractor along any of said slides and at selected angular positions with respect thereto.

2. In a contour generator for guiding a forming tool along exactly intersecting contour portions, a plate forming a table adapted to be mounted in an adjustably fixed position upon a reproducing machine, a series of slides fitted into grooves in the upper portion of said plate, at least one of the grooves being angularly related to the remaining grooves, means connected between said slides and said plate for adjusting said slides relative to said plate, bushings in said slides, means fittable into said bushings for constraining a leader to circular movement with respect to said bushings, and indicators mounted on each of said slides and on said table for the precise determination of the distance of the bushings of that slide to the center line of an angularly related slide.

3. A contour generator for guiding a cutting tool to produce exactly intersecting contour portions comprising a plate adapted to be mounted in an adjustably fixed position upon a reproducing machine, a groove extending laterally and another groove extending transversely across the upper surface of said plate, at least one slide received in the lateral groove and a slide in the transverse groove, and adjusting means for holding each slide at any predetermined position along a groove or moving the slide along the groove, and sockets in said slides for successively connecting the leader to any of the slides.

4. A contour generator for guiding a cutting tool to produce exactly intersecting contour portions comprising a plate adapted to be mounted in an adjustably fixed position upon a reproducing machine, a number of parallel grooves extending laterally across the upper surface of said plate, and at elast one groove extending transversely across the upper surface of said plate, a slide received in each of the parallel grooves on each side of the transverse groove and a slide in the transverse groove, and adjusting means for holding each slide at any predetermined position along a groove or moving the slide along the groove, and sockets in said slides for successively connecting the leader to any of the slides.

5. A contour generator for guiding a cutting tool to produce exactly intersecting contour portions comprising a plate adapted to be mounted in an adjustably fixed position upon a reproducing machine, a number of parallel grooves extending laterally across the upper surface of said plate, and at least one groove extending transversely across the upper surface of said plate, at least one slide received in each of the parallel grooves and a slide in the transverse groove, means connected to each of the slides and to the plate for adjusting each of the slides relative to the plate, sockets in said slides, a radius link having dowels adapted to be received in said sockets, and a slide in the said leader for positioning a leader arm of the reproducing machine with respect thereto and a socket in the last-named slide for receiving the leader.

6. A generator for producing exactly intersecting contour portions which comprises the combination of a pantograph having a leader and a guide bed, a guide plate, and means for supporting said guide plate at selected positions upon said bed, the table having a groove extending laterally and a groove extending transversely across the upper surface thereof, slides received in said grooves, and adjusting means for holding each slide at any predetermined position along a groove or moving the slide along the groove, and means for securing the said leader arm to either of the slides whereby the movements of the phonograph arm may be exactly controlled to produce angularly related movements.

LOUIS P. DE VAU.
ANTHONY F. BALTUS.

References Cited in the file of this patent

UNITED STATES PATENTS

| Number | Name | Date |
|---|---|---|
| 1,010,292 | McKinstry | Nov. 28, 1911 |
| 1,490,608 | Gilmour | Apr. 15, 1924 |
| 2,129,031 | Ross | Sept. 6, 1938 |
| 2,360,175 | Tiede | Oct. 10, 1944 |
| 2,409,290 | Lipp | Oct. 15, 1946 |
| 2,434,834 | Civitarese | Jan. 20, 1948 |
| 2,452,484 | Noble | Oct. 26, 1948 |